United States Patent
Amatangelo et al.

(10) Patent No.: US 6,550,559 B1
(45) Date of Patent: Apr. 22, 2003

(54) SYSTEM AND METHOD FOR CONTROLLING HUB LOCKS IN A FOUR-WHEEL DRIVE VEHICLE

(75) Inventors: Vincent Frank Amatangelo, Northville, MI (US); Rajiva Prakash, Canton, MI (US); Vicky Lynn Yarbrough, Romeo, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/686,707

(22) Filed: Oct. 11, 2000

(51) Int. Cl.7 .............................. B60K 17/34
(52) U.S. Cl. ................ 180/233; 180/245; 180/248; 701/89
(58) Field of Search ............... 180/233, 245, 180/248; 701/89; 74/861; 464/57

(56) References Cited

U.S. PATENT DOCUMENTS

| | | | | |
|---|---|---|---|---|
| 5,010,974 A | * | 4/1991 | Matsuda | 180/233 |
| 5,199,325 A | * | 4/1993 | Reuter et al. | 74/861 |
| 5,445,258 A | * | 8/1995 | Bigley et al. | 192/85 |
| 5,562,192 A | * | 10/1996 | Dick | 192/84.1 |
| 5,810,329 A | * | 9/1998 | Baron et al. | 251/129.15 |
| 5,927,426 A | * | 7/1999 | Hall et al. | 180/249 |

* cited by examiner

Primary Examiner—Kenneth R. Rice
Assistant Examiner—Christopher Buchanan
(74) Attorney, Agent, or Firm—F. G. McKenzie (57) ABSTRACT

A control system or apparatus (10) is provided which is deployed within a four-wheel drive vehicle (12) and which is adapted to automatically control the activation and deactivation (i.e., locking and unlocking) of hub locks (44) according to a certain control strategy. Hub locks (44) are effective to operatively connect and disconnect the front wheels (14) of vehicle (12) to the front axle assembly (16), thereby allowing torque from the front driveshaft (22) of the vehicle to be transferred to the front wheels (14) when the vehicle (12) operates in a four-wheel drive mode. Control system (10) is effective to detect system faults and malfunctions and to selectively alter the hub locks control strategy in response to such a detection, thereby substantially preventing the undesired locking/unlocking of the hub locks (44) resulting in possible ratcheting, binding or damage to the hub locks (44).

13 Claims, 5 Drawing Sheets

| PVH_Ctrl_Old | Enc_Pos_Mod | PVH_Ctrl |
|---|---|---|
| LOCK OR UNLOCK OR DO_NOTHING OR OFF | 2H | UNLOCK |
| | 4H OR 4L | LOCK |
| | N | LOCK |
| | BG1 OR BG 21 | DO_NOTHING |
| | BG22 OR BG31 OR BG32 OR BG4 | LOCK |
| | BG 2? | DO_NOTHING |
| | BG 3? | LOCK |
| | INVALID OR UNKNOWN | DO_NOTHING |
| UNKNOWN | x | DO_NOTHING |

SYSTEM AND METHOD FOR CONTROLLING HUB LOCKS IN A FOUR-WHEEL DRIVE VEHICLE

FIELD OF THE INVENTION

This invention generally relates to a system and method for controlling hub locks in a four-wheel drive vehicle and more particularly, to a system and method for controlling vacuum pulse hub locks in a four-wheel drive vehicle which employs an improved methodology that compensates for faulty operation and/or malfunction of the four-wheel drive control system.

BACKGROUND OF THE INVENTION

Four-wheel drive vehicles typically include a transfer case which selectively transfers torque and power from the vehicle's input shaft to primary and secondary driveshafts (e.g., rear and front driveshafts), thereby selectively rotating the primary and secondary driveshafts. The transfer case selectively operates in several different "drive modes", which determine the manner in which the transfer case delivers power to the primary and secondary driveshafts. These modes may include a two-wheel drive operating mode "2H", in which all of the torque from the input shaft is delivered to the primary or rear driveshaft, and one or more four-wheel drive operating modes (e.g., a four-wheel drive high mode "4H" and low mode "4L"), in which the transfer case provides torque to all four wheels.

Four-wheel drive vehicles also typically include "hub lock" mechanisms which enable the front or "secondary" wheels to be selectively connected and disconnected from the vehicle's front or "secondary" driveline. These hub lock mechanisms are activated as the vehicle is shifted from a two-wheel drive mode to a four-wheel drive mode, thereby allowing the torque from the front or secondary driveshaft to be communicated to the front or secondary wheels. These hub locks are often automatically actuated by use of a controller or control system. While these prior control systems can provide timely hub lock deployment, they suffer from some drawbacks.

For example and without limitation, these prior systems typically activate and deactivate (i.e., lock and unlock) the hub locks based upon the position of the vehicle's transfer case motor. This motor is operatively coupled to an encoder which is communicatively coupled to a controller which selectively causes the shaft of the motor to occupy a certain desired position, thereby causing the transfer case to operate in one of the foregoing drive modes. The controller is communicatively coupled to the encoder assembly, effective to allow the controller to ascertain the motor position. Based on information received from the encoder, the controller is able to determine the position of the motor (e.g., whether the motor is in a position corresponding to a two-wheel drive mode or a position corresponding to a four-wheel drive mode), and thereby determine when to activate and/or deactivate the hub locks. Typically, communication between the encoder assembly and the controller occurs by the use of binary signals and binary codes representing different motor positions based upon a particular binary encoding methodology. These communications are prone to error and undesired malfunction or errant operation (e.g., errors or faults in the electrical communication often cause the controller to be incorrectly informed of the position of the motor). Hence, the information used to control the hub locks (e.g., the encoder reading) can be incorrect and can cause the hub locks to be locked or unlocked at inappropriate or incorrect times, thereby causing undesired binding, ratcheting and/or potential damage to the hub locks.

There is therefore a need for a method for controlling hub locks in a four-wheel drive vehicle which is effective to compensate for system faults, thereby preventing the undesired activation and/or deactivation of the hub locks.

SUMMARY OF THE INVENTION

It is a first object of the invention to provide a system and method for controlling hub locks within a four-wheel drive vehicle which overcomes at least some of the previously delineated drawbacks of prior systems, devices, and/or methods.

It is a second object of the invention to provide a system and method for controlling vacuum pulse hub locks in a four-wheel drive vehicle which compensates for faults within the vehicle's transfer case control system, thereby ensuring that the hub locks are not undesirably activated or deactivated.

It is a third object of the invention to provide a system and a method for controlling hub locks within a four-wheel drive vehicle which detects faults within the vehicle's transfer case control system and prevents the improper actuation of the hub locks in response to such a detection.

According to a first aspect of the present invention a system for controlling a hub locks assembly in a four-wheel drive vehicle having a transfer case which includes a motor which selectively causes the transfer case to operate in a plurality of operating modes, the system comprising: an encoder which is adapted to detect positions of the motor and to generate signals describing the detected positions; and a controller which is communicatively coupled to the hub locks assembly and to the encoder, the controller being effective to receive the signals and to selectively lock and unlock the hub locks assembly according to a certain control strategy based upon the signals, the controller being further effective to detect faults within the system and to selectively alter the control strategy based upon the detected faults.

According to a second aspect of the present invention a method for controlling a hub locks assembly in a four-wheel drive vehicle having a transfer case which includes a motor which is movable in a plurality of positions, effective to selectively cause the transfer case to operate in a plurality of operating modes, and an encoder which provides position readings corresponding to the position of the motor, the method comprising the steps of: selectively locking and unlocking the hub locks based upon the position readings; determining whether the motor is turned off; and ignoring position readings from the encoder indicating a changed position of the motor when the motor is off.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
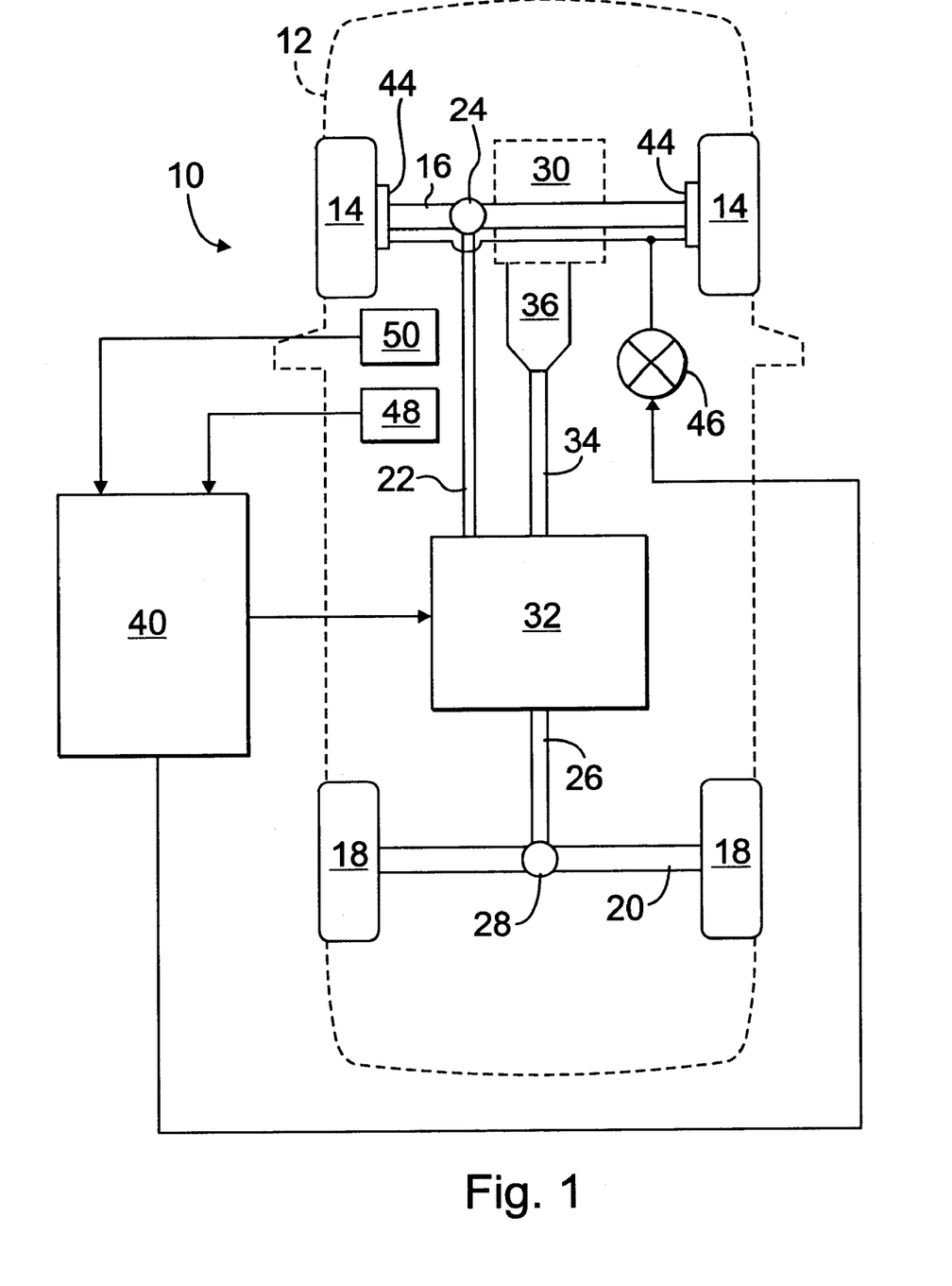
FIG. 1 is a schematic diagram of a four-wheel drive vehicle including a system for controlling the vehicle's hub locks which incorporates the teachings of the preferred embodiment of the invention.

Referring now to FIG. 1, there is shown a control system or apparatus 10 made in accordance with the teachings of the preferred embodiment of the invention. System 10 is deployed upon a four-wheel drive vehicle 12 and is adapted to automatically control the activation and deactivation (i.e., locking and unlocking) of hub locks 44 which are effective to operatively connect and disconnect the front wheels 14 of vehicle 12 to the front axle assembly 16. This is how torque from the front driveshaft 22 of the vehicle is transferred to the front wheels 14 when the vehicle operates in a four-wheel drive mode.

Vehicle 12 further includes a pair of rear wheels 18 which are operatively mounted upon a rear axle assembly 20. Front axle assembly 16 is operatively coupled to and receives torque and power from front driveshaft 22 through a front differential assembly 24, and rear axle 20 is operatively coupled to and receives torque and power from a rear driveshaft 26 through a rear differential assembly 28.

Front and rear driveshafts 22, 26 selectively receive torque and power from the vehicle engine 30 through the transfer case 32. Particularly, torque and/or power generated by the engine 30 is delivered to transfer case 32 through an input shaft 34 which is coupled to the transmission system or assembly 36. Transfer case 32 includes a planetary gearing assembly and a conventional electromagnetic clutch assembly which selectively and cooperatively transfer torque to the front and rear driveshafts 22, 26. It should be appreciated that the terms "front" and "rear" are used herein for convenience purposes only (e.g., to respectively refer to a secondary and primary driveshaft), and in alternate embodiments of the invention, the front and rear driveshafts may be interchanged (e.g., the front driveshaft may act as a primary driveshaft).

System 10 includes a conventional micro-controller or controller 40 operating under stored program control. Controller 40 is electrically, physically, and communicatively coupled to vehicle sensors and inputs 48, mode select switch 50, valve assembly 46 and transfer case 32. Vehicle sensors and inputs 48 include without limitation, the vehicle's ignition key, brake-switch, PRNDL/Clutch (e.g., shifting assemblies), and vehicle speed sensors. These sensors indicate whether the operating parameters are appropriate to perform a switch in the vehicle's operating or drive mode.

Controller 40 selectively operates in several different "modes", based upon the position of the user-operated mode select switch 50, which comprises a conventional and commercially available selectively positionable switch or shifter which allows a user to select between the various operating modes. In the preferred embodiment, the switch 50 allows a user to selectively place the transfer case controller 40 in either a two-wheel drive "2H" operating mode; a four-wheel drive high operating mode "4H"; or a four-wheel drive low operating mode "4L". In 2H mode, the transfer case is substantially disengaged at all times, and all of the torque from the transmission is delivered to the primary or rear driveshaft 26. In 4H mode, the transfer case provides torque to all four-wheels, and a relatively "high" gearing ratio exists between the transmission 36 and the driveshafts 22, 26 (e.g., approximately 1 to 1). In 4L mode, the transfer case provides torque to all four-wheels, and a relatively "low" gearing ratio exists between the transmission 36 and the driveshafts 22, 26 (e.g., approximately 2.5 to 1).

Controller 40 is further communicatively coupled to valve assembly 46 which selectively activates and deactivates (e.g., locks and unlocks) hub locks 44 based upon signals received from controller 40. In the preferred embodiment, hub locks 44 are vacuum pulse type hub locks which are selectively actuated by a vacuum reservoir which is selectively connected and disconnected from hub locks 44 by use of valve assembly 46. As shown best by FIG. 2, valve assembly 46 includes two selectively actuatable solenoids 45, 47 which are controlled by signals received from controller 40, effective to lock and unlock the hub locks 44. In one non-limiting embodiment, hub locks 44 comprise the vacuum pulse-actuated hub locks described in U.S. Pat. No. 5,445,358 of Bigley et al., which is fully and completely incorporated herein by reference.

Figure 2:
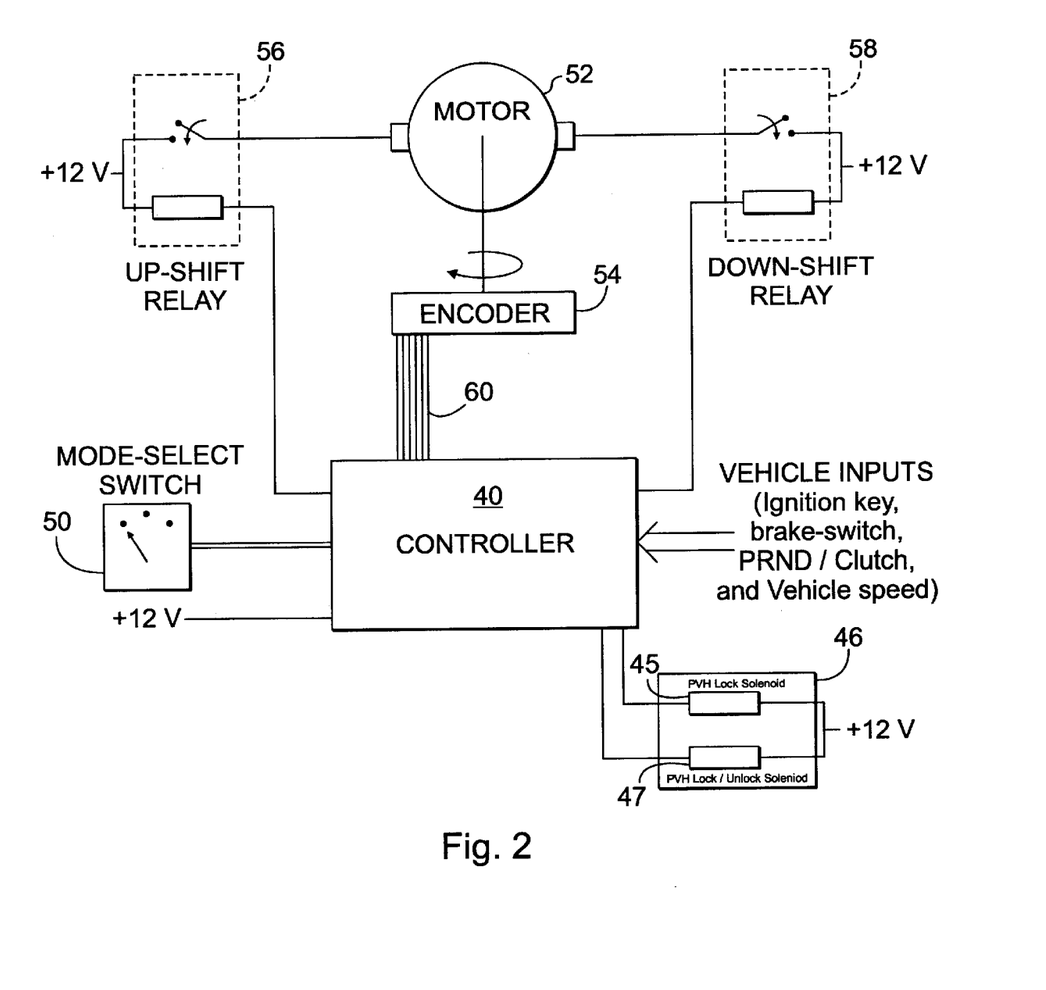
FIG. 2 is a schematic diagram of the shift control system used within the system shown in FIG. 1.

To better understand the system 10, reference is made to FIG. 2 which illustrates a schematic diagram of the shift motor 52, controller 40 and valve assembly 46. As shown, transfer case portion or assembly 32 includes a selectively positionable bi-directional motor 52, and a motor position sensor or an encoder assembly 54. An "up-shift" relay 56 and a "down-shift" relay 58 may or may not be contained within transfer case assembly 32. The motor 52 is operatively coupled to the planetary gear or gear assembly and a clutch/synchronizer and is effective to cause the transfer case 32 to switch between operating modes. Particularly, motor 52 is effective to provide both range selection for transfer case 32 (e.g., between 4H mode and 4L mode), and to provide mode selection for transfer case 32 (e.g., between two-wheel drive and four-wheel drive modes).

The encoder assembly 54 is physically, electrically, and communicatively coupled to the motor 52 and senses the spatial position of the shaft of the motor 52 and communicates this position information on bus 60 to the controller 40. Hence, the position of the shaft of the motor 52 determines which driveshaft(s) 22, 26 are to receive torque as well as the type of gear ratio that is to be employed by the gear assembly. In one non-limiting embodiment, the encoder assembly 54 is substantially similar to the encoder described within U.S. patent application Ser. No. 08/999,155 by Prakash et al., which is assigned to the present assignee and which is fully and completely incorporated herein by reference.

Figure 3:
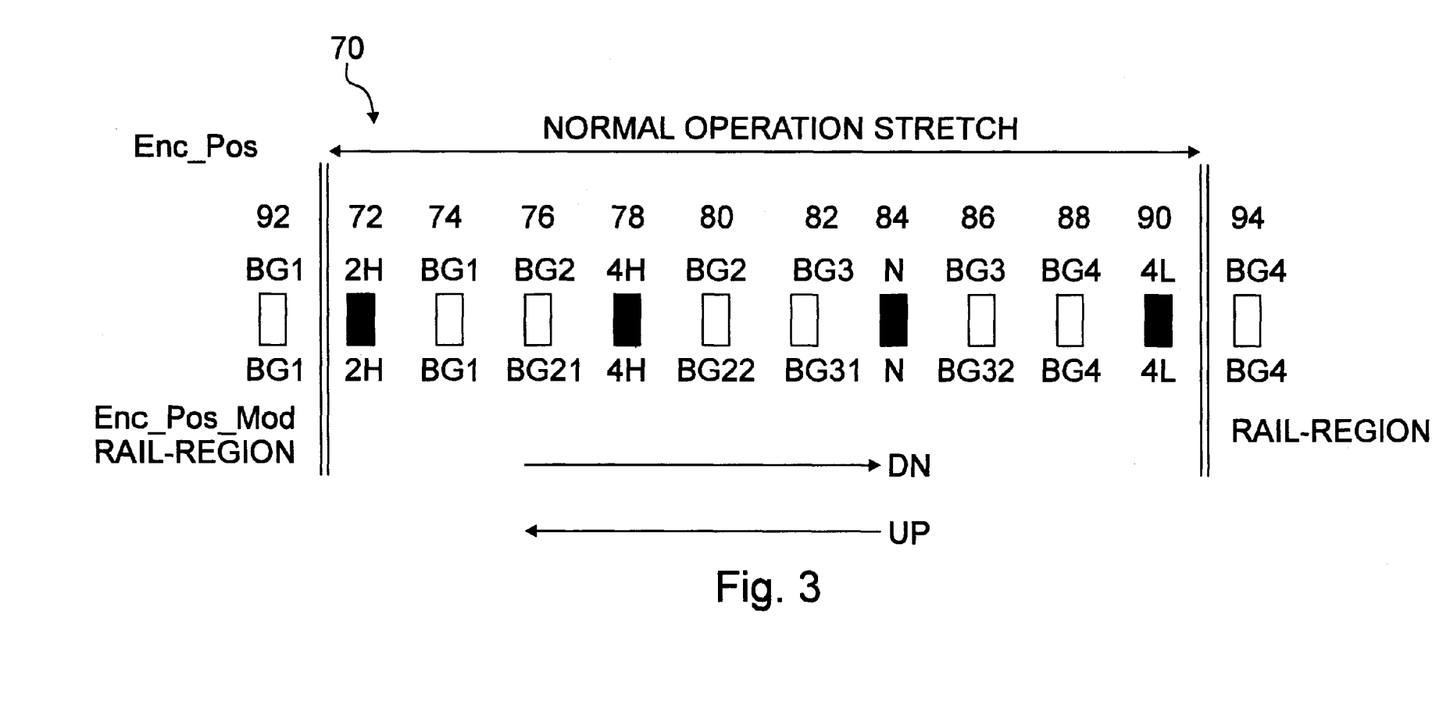
FIG. 3 is a diagram illustrating various positions of the transfer case motor that is used within the system shown in FIG. 2.

The various positions of motor 52 and/or transfer case 32 in the preferred embodiment of the invention are illustrated in diagram 70 of FIG. 3. As shown, motor 52 and/or transfer case 32 is selectively positionable in a 2H mode position 72, a 4H mode position 78, and a 4L mode position 90. The transfer case 32 further includes a neutral "N" position 84 between 4H and 4L wherein engine 30 is disconnected from driveshafts 22, 26. In the preferred embodiment, the "N" position 84 is not selectable by the operator and the mode select switch 50 has only 2H, 4H and 4L positions.

The transfer case 32 and/or motor 52 may also reside in positions 74, 76, 80, 82, 86, and 88, which reside between drive modes. For the purposes of this disclosure, these positions are called "BG" or "between gear" positions. Additionally, an extended position beyond 2H is provided at one extreme of motor rotation. This extension is referred to as a first rail region 92. Within the first rail region, 2H is still engaged, although the position of the transfer case 32 and/or motor 52 does not correspond with the optimal 2H position 72. A second rail region 94 is provided at the opposite extreme of motor travel adjacent to 4L. These rail regions 92, 94 are not commanded positions, but provide for motor "over-travel". Each of positions 72–94 correspond to different angular positions of the motor 52 (e.g., the shaft of motor 52) and are detected by encoder 54 and communicated to controller 40.

A desired mode is selected by use of the mode selection switch 50 and the desired operating mode is communicated to the controller 40. Controller 40 generates a signal to a selected one of the relay assemblies 56, 58, effective to supply power to the motor 52, thereby causing the motor to move in either a clockwise or counter-clockwise direction and causing either an "up-shifting" or "down-shifting" movement. The encoder assembly 54 senses the position of the motor 52 (i.e., a main-stop position, a "BG" position, the "N" position, or a rail position) and communicates this information, by the use of a binary type signal (i.e., a signal having a certain number of bits which may respectively equal only one of two values—either a logically low or "zero" value or a logically high or "one" value) to the controller 40. This signal is produced, in one embodiment of the invention, by the use of four separate channels of information which are created by the use of bus 60 and which exist between the encoder assembly 54 and the controller 40. In this manner, the various bit values corresponding to the four channels change dynamically in accordance with a sensed motor position. Each main-stop position and each intermediate position has a code comprised of the bit values for each channel of information.

Figure 4:
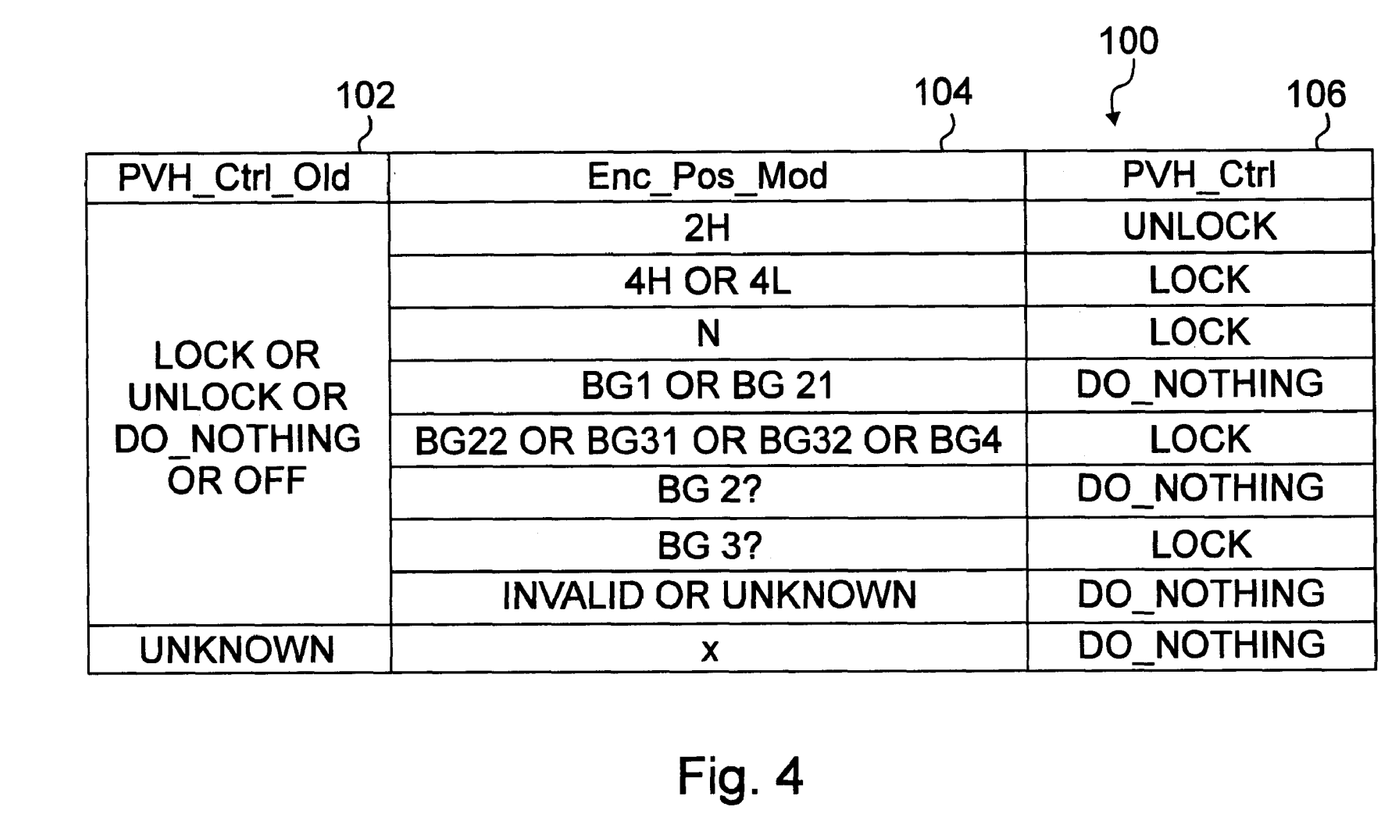
FIG. 4 is a table illustrating a strategy used by the control system shown in FIG. 1 to lock and unlock the vehicle's hub locks.

In operation, controller 40 uses the positional information from encoder 54 to execute a strategy for locking and unlocking hub locks 44. Referring now to FIG. 4, there is shown one non-limiting embodiment of a strategy used by controller 40 to control hub locks 44. The present strategy is executed when the ignition key is in the "RUN" position and is subject to the below-described "limited operation strategy". If the ignition key is in any other position (e.g., "OFF", "START" or "ACCESSORY" positions), no pulse vacuum hub lock ("PVH") control commands are executed by controller 40. Column 102 contains prior PVH control commands ("PVH_Ctrl_Old") (e.g., the PVH control command in the previous repetition cycle). Column 104 contains a modified encoder position value ("Enc_Pos_Mod"), which is illustrated in FIG. 3 and which splits the BG codes into distinct physical positions (e.g., BG21, BG22, BG31, BG32). In addition, the values of BG2? and BG3?, are possible due to incorrect codes which are occasionally obtained as a result of noise transients despite the use of filters. Column 106 includes values corresponding to current PVH control command, which is used by controller 40 to activate and/or deactivate the hub locks 44. Particularly, based on the value of the command, controller 40 ensures that the hub locks 44 enter into or remain in a locked state ("LOCK") or unlocked state ("UNLOCK"). If the value of the PVH_Ctrl is equal to "DO_NOTHING", controller 40 will take no action with respect to the hub locks 44. As shown in table 100, whenever the encoder 54 is in the 2H position, controller 54 will ensure that the hub locks 44 are unlocked unless the previous controller command PVH_Ctrl_Old is unknown. When encoder 54 is in the 4H, 4L, N, BG22, BG31, BG32, BG4 or BG3?, the encoder will ensure that the hub locks 44 are locked unless the previous controller command PVH_Ctrl_Old is unknown. When the previous controller command is unknown, controller 40 takes no action.

Importantly, the present invention includes a limited operation strategy for PVH control which supplements or acts in concert with the foregoing strategy to compensate for potential errors within the control system. Particularly, in the presence of certain detected faults, controller 40 alters the strategy shown in FIG. 4 and executes a modified "limited operation strategy". A preferred embodiment of this strategy is illustrated in the flow chart 110 of FIG. 5. As shown, strategy 110 begins when the controller 40 receives a new position value Enc_Mod_Pos from encoder 54, as shown in functional block or step 112. Upon receipt of the new position value, controller 40 proceeds to functional block or step 114 and determines whether the shift motor 52 is "off" or not activated (e.g., relays 56, 58 are both "open" and therefore no power is flowing to motor 52). If the motor 52 is "off", controller 40 proceeds to functional block or step 116 and determines whether the new encoder position is neutral "N". If the new encoder position is not neutral, controller 40 proceeds to functional block or step 118 and does not act on or "ignores" the new position value. In functional block or step 120, controller 40 completes any previous locking or unlocking action that was being performed when the new position value was received. Steps 114–120, substantially prevent controller 40 from acting on any undesired or errant encoder values which may spontaneously arise when motor 52 is not actually moving. Moreover, step 120 ensures that any previously commenced locking or unlocking action is properly completed in such a circumstance.

Figure 5:
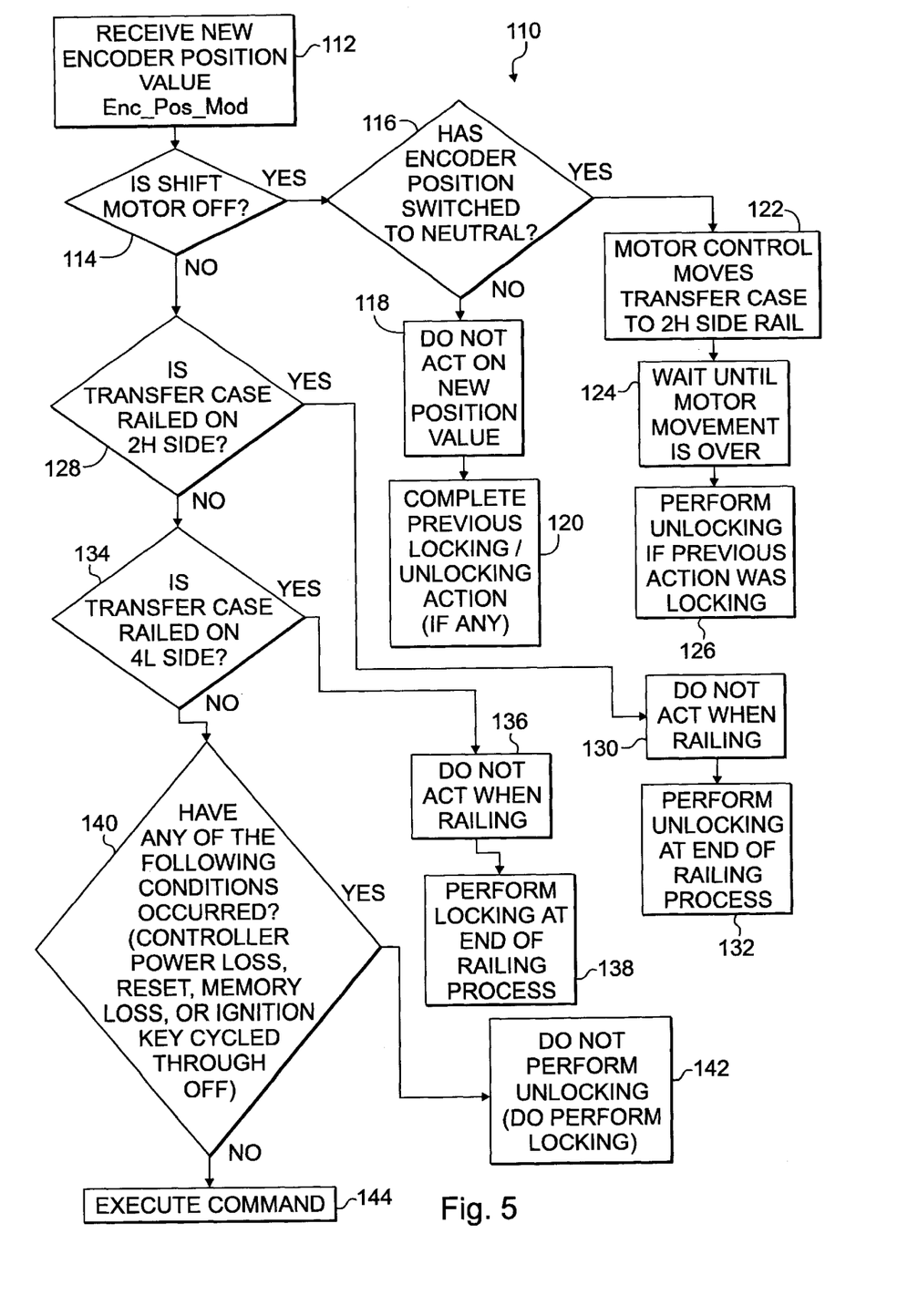
FIG. 5 is a flow diagram illustrating a limited operation strategy for controlling the vehicle's hub locks which is used by the system shown in FIG. 1 in the event of faults and errors.

If the new encoder position is determined to be neutral in step 116, controller 40 proceeds to step 122 and the motor control portion or strategy of controller 40 moves the transfer case motor 52 out of its present position to the 2H-side rail, in case the present position read by the controller 40 is neutral. The PVH control strategy does not respond until the end of the motor shift, as shown in functional block or step 124. At the end of the motor shift, controller 40 performs unlocking if the previous PVH control command was locking, and otherwise takes no action, as shown in functional block or step 126. This sequence ensures that the vehicle is not left in "Neutral" just in case the new position reading does correspond to true physical position and that the vehicle is in proper driving mode without the experience of any binding or ratcheting.

If controller 40 determines in step 114 that the shift motor is not "off", controller 40 proceeds to functional block or step 128, where it determines whether the transfer case is "railed" on the 2H side (e.g., position 92 in FIG. 3), due to a position sensor fault (e.g., an encoder fault) or any other type of fault. If the motor 52 is railed on the 2H side, controller 40 proceeds to functional block or step 130, where it does not act on or temporarily "ignores" any new position values until the railing action is completed. In functional block or step 132, once the motor 52 is turned off and the railing action is complete, controller 40 performs unlocking if the previous state or command was locking. This ensures that the hub locks 44 are unlocked in 2H if the motor is railed to the 2H side due to any fault or malfunction.

If controller 40 determines in step 128 that the shift motor is not "railed" on the 2H side, controller 40 proceeds to functional block or step 134, where it determines whether the transfer case is "railed" on the 4L side (e.g., position 94 in FIG. 3), due to a position sensor fault (e.g., and encoder fault) or any other fault. If the motor 52 is railed on the 4L side, controller 40 proceeds to functional block or step 136, where it does not act on or temporarily "ignores" any new position values until the railing action is completed. In functional block or step 138, once the motor 52 is turned off and the railing action is complete, controller 40 performs PVH locking. This ensures that the hub locks 44 are locked if the motor is railed to the 4L side due to any fault or malfunction.

If controller 40 determines in step 134 that the shift motor is not "railed" on the 4L side, controller 40 proceeds to functional block or step 140, where it determines whether it has temporarily lost and regained power, whether it has automatically reset or rebooted, whether it has suffered a memory loss problem, or whether the ignition key has been cycled through the "OFF" position. If any of these conditions has occurred, controller 40 proceeds to functional block or step 142, where it ignores any unlocking command (e.g., if the encoder position reads 2H) and performs only locking commands (e.g., if the encoder position reads 4H or 4L). If in step 140 controller 40 determines that none of the previously delineated conditions has occurred, it proceeds to step 144 and executes or acts upon the received command (e.g., using the strategy shown in FIG. 4).

The previously delineated PVH control strategy substantially decreases and/or eliminates the undesired locking and unlocking of the hub locks 44 in situations where faults are or may be present with the control system. As such, the present system and method substantially eliminates ratcheting, binding and potential damage to the hub locks which may occur in the presence of encoder or system errors or malfunction. It should be appreciated that fault control strategy 110 may include fewer, different or additional steps and may perform the disclosed steps and/or other steps in a different order or manner.

It should be understood that the invention is not limited to the exact construction and method which has been delineated above, but that various changes and modifications may be made without departing from the spirit and the scope of the inventions as are delineated in the following claims.

What is claimed is:

1. A method for controlling a hub locks assembly in a four-wheel drive vehicle having a transfer case which includes a motor which is movable in a plurality of positions, effective to selectively cause said transfer case to operate in a plurality of operating modes, and an encoder which provides position readings corresponding to said position of said motor, said method comprising the steps of:

providing a controller which is coupled to said encoder and said hub locks assembly, wherein said controller receives said position readings corresponding to said position of said transfer case motor from said encoder;

selectively locking and unlocking said hub locks based upon said position readings;

receiving a position reading from said encoder indicating a changed position of said motor;

determining whether said motor is turned off; and ignoring said position reading from said encoder indicating a changed position of said motor when said motor is turned off.

2. The method of claim 1 wherein said transfer case includes a two-wheel drive high side, said method further comprising the steps of:

detecting when said transfer case is railed on said two-wheel drive high side;

temporarily ignoring position readings from said encoder when said transfer case is railed on said two-wheel drive high side;

determining a previous hub locks control action; and unlocking said hub locks assembly after said railing is completed motor if said previous hub locks control action was locking.

3. The method of claim 1 wherein said transfer case comprises a four-wheel drive low side, said method further comprising the steps of:

detecting when said transfer case is railed on said four-wheel drive low side;

temporarily ignoring position readings from said encoder when said transfer case is railed on said four-wheel drive low side;

determining a previous hub locks control action; and locking said hub locks assembly after said railing is completed motor if said previous hub locks control action was unlocking.

4. The method of claim 1 wherein said vehicle further comprises a controller which is communicatively coupled to said encoder and to said hub locks and which is effective to selectively control said hub locks, said method further comprising the steps of:

determining if said controller has lost and regained power; and ignoring position readings from said encoder which correspond to unlocking of said hub locks and which are received after said controller has lost and regained power.

5. The method of claim 1 further comprising the steps of:

determining if said controller has suffered a memory loss; and ignoring position readings from said encoder which correspond to unlocking of said hub locks and which are received after said controller has suffered a memory loss.

6. The method of claim 1 further comprising the steps of:

determining if said controller has been reset; and ignoring position readings from said encoder which correspond to unlocking of said hub locks and which are received after said controller has been reset.

7. The method of claim 1 wherein said vehicle includes an ignition key and further comprising the steps of:

determining if said ignition key has been cycled through "OFF"; and ignoring position readings from said encoder which correspond to unlocking of said hub locks and which are received after said ignition key has been switched to said "OFF" position.

8. The method of claim 1 wherein said motor includes a neutral position, and wherein said controller is adapted to automatically move said motor out of said neutral position if said motor is turned off, said method further comprising the step of:

unlocking said hub locks after said motor has moved out of said neutral position if the previous control action was locking.

9. A method for controlling hub locks in a four wheel drive vehicle including a transfer case having a motor which may be positioned in a plurality of motor positions, said method comprising the steps of:

defining each of said plurality of motor positions into distinct physical positions, wherein said distinct physical positions comprise a two wheel drive high position, a four wheel drive high position, a neutral position, a four wheel low position, first between gears positions are disposed between said two wheel drive high position and said four wheel drive high position, second between gears positions which are disposed between said four wheel drive high position and said neutral position, third between gears positions which are disposed between said neutral position and said four wheel drive low position;

providing an encoder which is coupled to said motor and which generates signals corresponding to each of said distinct motor positions;

unlocking said hub locks if said encoder signal corresponds to a two wheel drive high position;

locking said hub locks if said encoder signal corresponds to said four wheel drive high position, said four wheel drive low position, said second between gears positions, and said third between gears positions; and ignoring said encoder signals corresponding to said first between gears positions.

10. The method of claim 9 wherein said motor positions further comprise a two wheel drive high railing position and a four wheel drive low railing position, said method further comprising the steps of:

locking said hub locks if said encoder signal corresponds to said four wheel drive low railing position; and ignoring said encoder signals corresponding to said two wheel drive high railing position.

11. The method of claim 9 wherein said step of ignoring said encoder signals comprises the step of taking no action with respect to said hub locks, thereby maintaining a current state of said hub locks.

12. The method of claim 9 wherein said motor positions further comprise a two wheel drive high railing position and a four wheel drive low railing position, said method further comprising the steps of:

determining whether said motor is off;

ignoring said encoder signals indicating a changed position of said motor when said motor is off; and taking no action with respect to said hub locks when said motor is not off and said motor position is a one of said railing positions.

13. The method of claim 12 wherein said step of taking no action with respect to said hub locks when said motor is not off and said motor position is a one of said railing positions further comprises the steps of:

unlocking said hub locks at an end of said railing when said motor position was a two wheel drive high railing position; and locking said hub locks at an end of said railing when said motor position was a four wheel drive low railing position.

* * * * *